(12) United States Patent
Kandukuri et al.

(10) Patent No.: US 12,735,269 B2
(45) Date of Patent: Sep. 15, 2026

(54) CONVEYOR SYSTEM AND AN ASSOCIATED METHOD

(71) Applicant: INTELLIGRATED HEADQUARTERS, LLC, Mason, OH (US)

(72) Inventors: Sai Sudhir Venkata Raghavendta Kandukuri, Mason, OH (US); Sameer Sanjay Nandikar, Mason, OH (US); Hongjian Li, Mason, OH (US); Tameem Hayat Khan, Mason, OH (US); Timothy Roger Williams, Mason, OH (US); Daniel Lewis Kosht, Mason, OH (US); Xuyong Tu, Mason, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 97 days.

(21) Appl. No.: 18/680,828

(22) Filed: May 31, 2024

(65) Prior Publication Data

US 2025/0368452 A1 Dec. 4, 2025

(51) Int. Cl.

*B65G 43/02* (2006.01)
*B65G 13/02* (2006.01)
*B65G 43/10* (2006.01)

(52) U.S. Cl.

CPC ............. *B65G 43/02* (2013.01); *B65G 13/02* (2013.01); *B65G 2203/0275* (2013.01)

(58) Field of Classification Search

None
See application file for complete search history.

(56) References Cited

U.S. PATENT DOCUMENTS 6,253,909 B1 * 7/2001 Kalm .................. B65G 47/261 198/781.06
7,243,781 B2 * 7/2007 Taylor ................. B65G 47/261 198/781.05

(Continued)

FOREIGN PATENT DOCUMENTS

CN 117388692 A 1/2024

OTHER PUBLICATIONS

Extended European Search Report Mailed on Sep. 26, 2025 for EP Application No. 25172823, 9 page(s).

*Primary Examiner* — Gene O Crawford
*Assistant Examiner* — Muhammad Awais
(74) *Attorney, Agent, or Firm* — Alston & Bird LLP

(57) ABSTRACT

A conveyor system and an associated methods are provided. An example conveyor system may include a plurality of conveyor sections and a conveyor system controller. In some embodiments, the conveyor system controller may be configured to identify a MDR operations circuitry fault. In some embodiments, the conveyor system controller may be configured to determine that the MDR operations circuitry fault is associated with a first MDR operations circuitry of a first conveyor section of the plurality of conveyor sections. In some embodiments, the conveyor system controller may be configured to initiate performance of one or more MDR operations circuitry fault response actions based at least in part on the determination that the MDR operations circuitry fault is associated with the first MDR operations circuitry.

18 Claims, 7 Drawing Sheets

(56) References Cited

U.S. PATENT DOCUMENTS

| | | | | |
|---|---|---|---|---|
| 2004/0222070 | A1* | 11/2004 | Neiser | B65G 1/08 198/786 |
| 2012/0024669 | A1* | 2/2012 | Danelski | B65G 13/02 198/781.05 |
| 2012/0048682 | A1* | 3/2012 | Itoh | B65G 13/02 198/780 |
| 2016/0075518 | A1* | 3/2016 | Itoh | B65G 43/00 324/207.2 |
| 2023/0108012 | A1* | 4/2023 | Sadasivan | B65G 23/08 198/788 |
| 2023/0174316 | A1* | 6/2023 | Shenoy | B65G 43/10 700/230 |
| 2023/0382653 | A1* | 11/2023 | Greyson | B65G 13/06 |

* cited by examiner

CONVEYOR SYSTEM AND AN ASSOCIATED METHOD

TECHNOLOGICAL FIELD

Embodiments of the present disclosure relate generally to a conveyor system and an associated method.

BACKGROUND

Applicant has identified many technical challenges and difficulties associated with conveyor systems and an associated methods. Through applied effort, ingenuity, and innovation, Applicant has solved problems related to conveyor systems and associated methods by developing solutions embodied in the present disclosure, which are described in detail below.

BRIEF SUMMARY

Various embodiments described herein relate to a conveyor system and associated with methods.

In accordance with one aspect of the disclosure, a conveyor system is provided. In some embodiments, the conveyor system controller may be configured to identify a MDR operations circuitry fault. In some embodiments, each of the plurality of conveyor sections comprises a motorized drive roller (MDR) and a MDR operations circuitry. In some embodiments, the conveyor system controller may be configured to determine that the MDR operations circuitry fault is associated with a first MDR operations circuitry of a first conveyor section of the plurality of conveyor sections. In some embodiments, the conveyor system controller may be configured to initiate performance of one or more MDR operations circuitry fault response actions based at least in part on the determination that the MDR operations circuitry fault is associated with the first MDR operations circuitry.

In some embodiments, the MDR operations circuitry fault is indicative of a power supply fault In some embodiments, the MDR operations circuitry fault is indicative of a network fault In some embodiments, the conveyor system controller may be configured to identify a second MDR operations circuitry of a second conveyor section of the plurality of conveyor sections. In some embodiments, the conveyor system controller may be configured to determine that the second MDR operations circuitry is downstream from the first MDR operations circuitry. In some embodiments, the conveyor system controller may be configured to determine that the second MDR operations circuitry is associated with a connection fault based on the determination that the second MDR operations circuitry is downstream from the first MDR operations circuitry.

In some embodiments, the conveyor system controller may be configured to identify a third MDR operations circuitry of a third conveyor section of the plurality of conveyor sections. In some embodiments, the conveyor system controller may be configured to determine that the third MDR operations circuitry is upstream from the first MDR operations circuitry. In some embodiments, the conveyor system controller may be configured to determine that the third MDR operations circuitry is not associated with a connection fault based on the determination that the third MDR operations circuitry is upstream from the first MDR operations circuitry.

In some embodiments, initiating performance of one or more MDR operations circuitry fault response actions may include generating a conveyor system fault schematic interface component. In some embodiments, initiating performance of one or more MDR operations circuitry fault response actions may include causing rendering of the conveyor system fault schematic interface component on a conveyor system interface.

In some embodiments, the conveyor system fault schematic interface component comprises a first visual representation indicating that the MDR operations circuitry fault is associated with the first MDR operations circuitry of the first conveyor section.

In some embodiments, the conveyor system fault schematic interface component comprises a second visual representation indicating that a second MDR operations circuitry of a second conveyor section of the plurality of conveyor sections is associated with a connection fault.

In accordance with another aspect of the disclosure, a method is provided. In some embodiments, the method may include identifying a plurality of conveyor sections. In some embodiments, each of the plurality of conveyor sections comprises a motorized drive roller (MDR) and a MDR operations circuitry. In some embodiments, the method may include identifying a MDR operations circuitry fault. In some embodiments, the method may include determining that the MDR operations circuitry fault is associated with a first MDR operations circuitry of a first conveyor section of the plurality of conveyor sections. In some embodiments, the method may include initiating performance of one or more MDR operations circuitry fault response actions based at least in part on the determination that the MDR operations circuitry fault is associated with the first MDR operations circuitry.

In accordance with another aspect of the disclosure, a computer program product is provided. In some embodiments, the computer program product includes at least one non-transitory computer-readable storage medium having computer program code stored thereon. In some embodiments, the computer program code, in execution with at least one processor, configures the computer program product for identifying a plurality of conveyor sections. In some embodiments, each of the plurality of conveyor sections comprises a motorized drive roller (MDR) and a MDR operations circuitry. In some embodiments, the computer program code, in execution with at least one processor, configures the computer program product for identifying a MDR operations circuitry fault. In some embodiments, the computer program code, in execution with at least one processor, configures the computer program product for determining that the MDR operations circuitry fault is associated with a first MDR operations circuitry of a first conveyor section of the plurality of conveyor sections. In some embodiments, the computer program code, in execution with at least one processor, configures the computer program product for initiating performance of one or more MDR operations circuitry fault response actions based at least in part on the determination that the MDR operations circuitry fault is associated with the first MDR operations circuitry.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
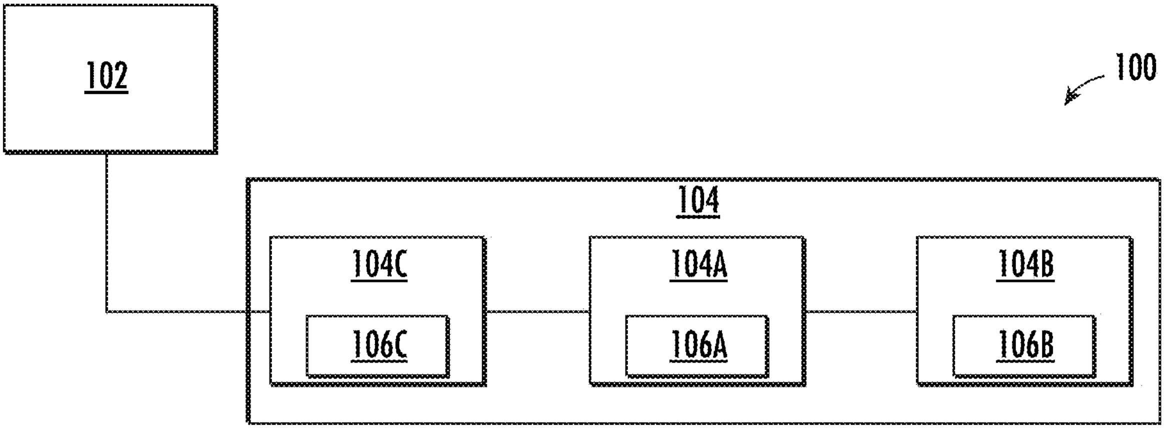
FIG. 1 illustrates a schematic view of an example conveyor system in accordance with one or more embodiments of the present disclosure.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated with conveyor systems and associated methods. As would be understood by one skilled in the field to which this disclosure pertains, there are numerous example scenarios in which conveyor systems and associated methods may be used.

In many applications, conveyor systems and associated method are desirable. In some examples, it may be desirable to use a conveyor system to facilitate movement of objects throughout a facility. For example, it may be desirable to use a conveyor system to facilitate movement of containers throughout a distribution center.

In some examples, a conveyor system may include one or more motorized drive roller circuitries to control motorized drive rollers to move objects throughout the conveyor system and/or the facility. In some examples, if the motorized drive roller circuitry is affected by a fault (e.g., network faults, power supply faults), the conveyor system may fail to function properly. For example, faults associated with motorized drive roller circuitry may result in object jams, damage to the conveyor system, and/or the like. Thus, conveyor systems in which circuitry faults can be detected and remedied in a timely and efficient manner are desirable.

Example conveyor system solutions do not contemplate detecting faults associated with the circuitry used to control motorized drive rollers of a conveyor system. Instead, example conveyor system solutions are reactive in that such solutions only detect the secondary effects of faults associated motorized drive roller circuitry. For example, such example conveyor system solutions are reactive in that such solutions only detect object jams and/or damage to the conveyor system, but not the fault associated with motorized drive roller circuitry that caused the object jams and/or damage to the conveyor system. Additionally, such example conveyor system solutions do not contemplate identification of the location of a fault associated with motorized drive roller circuitry. In some examples, a conveyor system may include a large number of separate motorized drive roller circuits that each control their own motorized drive rollers. As such, it is desirable to not only detect faults associated with motorized drive roller circuitry but also the particular motorized drive roller circuitry that is associated with a fault. Accordingly, there is a need for a conveyor system and associated methods that are configured to identify faults associated with motorized drive roller circuitry and the location of the fault in a conveyor system.

Thus, to address these and/or other issues related to conveyor systems, a conveyor system and associated methods are disclosed herein. For example, an embodiment in this disclosure, described in greater detail below, includes a conveyor system that includes a plurality of conveyor sections and a conveyor system controller. In some embodiments, the conveyor system controller may be configured to identify a MDR operations circuitry fault. In some embodiments, the conveyor system controller may be configured to determine that the MDR operations circuitry fault is associated with a first MDR operations circuitry of a first conveyor section of the plurality of conveyor sections. In some embodiments, the conveyor system controller may be configured to initiate performance of one or more MDR operations circuitry fault response actions based at least in part on the determination that the MDR operations circuitry fault is associated with the first MDR operations circuitry. Accordingly, the conveyor system and associated methods disclosed herein enable the proactive detection and localization of faults associated with motorized drive roller circuitry.

Example Systems and Apparatuses

With reference to FIGS. 1-4, embodiments herein relate to a conveyor system 100. In some embodiments, the conveyor system 100 may be configured to support and/or transport one or more objects throughout a facility. For example, the conveyor system may be configured to transport one or more objects (e.g., containers) throughout a distribution center. In some embodiments, the conveyor system 100 may include a conveyor system controller 102 and/or a plurality of conveyor sections 104.

In some embodiments, the conveyor system controller 102 may be configured to control one or more operations of the conveyor system 100. In this regard, the conveyor system controller 102 may be configured to control the operations of the conveyor system 100 such that the conveyor system 100 can support and/or transport one or more objects throughout a facility. For example, the conveyor system controller 102 may be configured to control the operations of the conveyor system 100 such that the conveyor system 100 can support and/or transport one or more objects (e.g., containers) throughout a distribution center.

In some embodiments, the conveyor system controller 102 may be located in proximity to one or more of the plurality of conveyor sections 104. For example, the conveyor system controller 102 may be disposed on one or more of the plurality of conveyor sections 104. As another example, the conveyor system controller 102 may be located within a facility in which the conveyor system 100 operates (e.g., within a distribution center in which the conveyor system operates). In some embodiments, the conveyor system controller 102 may be located remotely from the plurality of conveyor sections 104. For example, the conveyor system controller 102 may be a cloud-based controller located at a central computing location. As another example, the conveyor system controller 102 may be located at an enterprise control center of an enterprise associated with the facility. In this regard, for example, when the conveyor system controller 102 is located remotely from the plurality of conveyor sections 104, the conveyor system controller 102 may be configured to control the operations of the conveyor system 100 and one or more other conveyor systems (e.g., another conveyor system located at a different facility from the facility in which the conveyor system 100 is located).

In some embodiments, such as illustrated in FIG. 1, the plurality of conveyor sections 104 may include three conveyor sections. For example, the plurality of conveyor sections 104 may include a first conveyor section 104A. As another example, the plurality of conveyor sections 104 may include a second conveyor section 104B. As another example, the plurality of conveyor sections 104 may include a third conveyor section 104C. Although FIG. 1 illustrates that the plurality of conveyor sections 104 includes three conveyor sections, it would be understood by one skilled in the field to which this disclosure pertains that the plurality of conveyor sections 104 may include more or less conveyor sections. For example, the plurality of conveyor sections 104 may include two conveyor sections. As another example, the plurality of conveyor sections 104 may include four conveyor sections.

In some embodiments, each of the plurality of conveyor sections 104 may include a motorized drive roller (MDR) operations circuitry. For example, the first conveyor section 104A may include a first MDR operations circuitry 106A. As another example, the second conveyor section 104B may include a second MDR operations circuitry 106B. As another example, the third conveyor section 104C may include a third MDR operations circuitry 106C. In some embodiments, a conveyor section of the plurality of conveyor sections 104 may correspond to a conveyor zone. Additionally, or alternatively, a conveyor section of the plurality of conveyor sections 104 may correspond to a conveyor bed. In some embodiments, a conveyor bed may include one or more conveyor zones.

In some embodiments, the plurality of conveyor sections 104 may include a first portion of conveyor sections. In this regard, the first portion of conveyor sections may include some of the plurality of conveyor sections 104. For example, the first portion of conveyor sections may include the first conveyor section 104A and/or the second conveyor section 104B. In some embodiments, the plurality of conveyor sections 104 may include a second portion of conveyor sections. In this regard, the second portion of conveyor sections may include some of the plurality of conveyor sections 104. For example, the second portion of conveyor sections may include the third conveyor section 104C.

In some embodiments, at least a portion of the plurality of conveyor sections 104 may be organized into a series of conveyor sections. In this regard, for example, the third conveyor section 104C may be engaged with the first conveyor section 104A and the first conveyor section 104A may be engaged with the second conveyor section 104B. Said differently, for example, an object being transported throughout a facility by the conveyor system 100 may be transferred from the third conveyor section 104C to the first conveyor section 104A and from the first conveyor section 104A to the second conveyor section 104B. Additionally, or alternatively, an object being transported throughout a facility by the conveyor system 100 may be transferred from the second conveyor section 104B to the first conveyor section 104A and from the first conveyor section 104A to the third conveyor section 104C.

Figure 2:
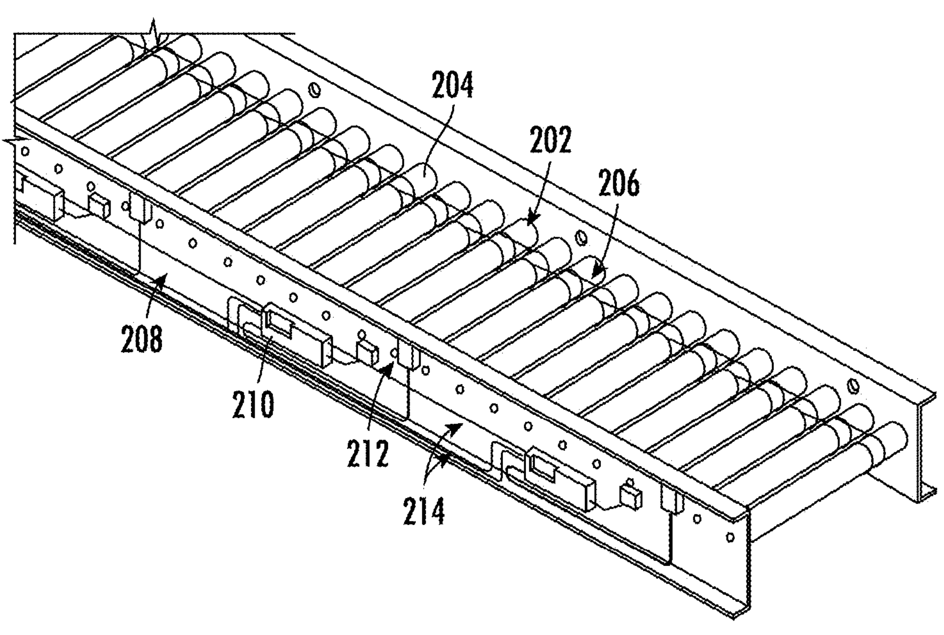
FIG. 2 illustrates an angled top view of an example conveyor section in accordance with one or more embodiments of the present disclosure.
Figure 3:
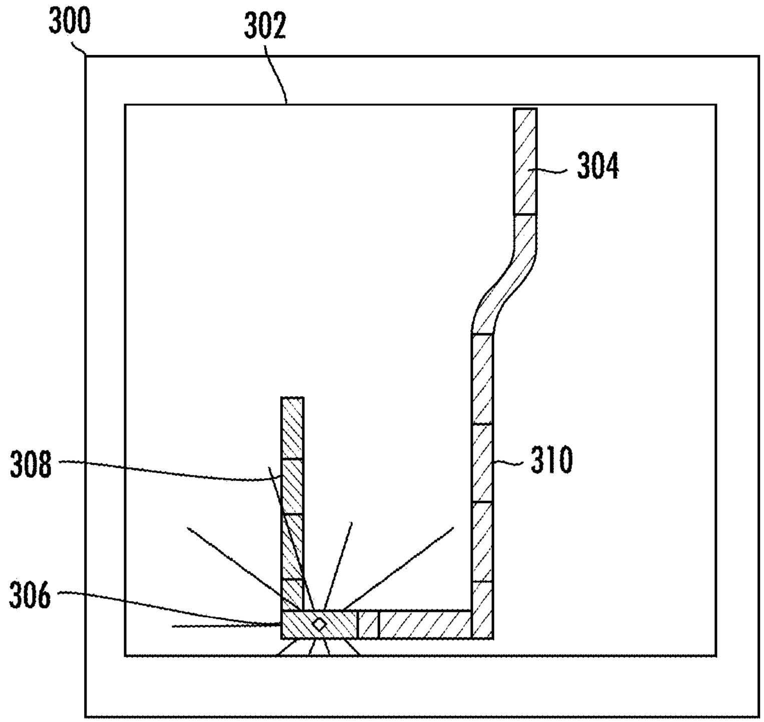
FIG. 3 illustrates an example interface in accordance with one or more embodiments of the present disclosure.

FIG. 2 illustrates an angled top view of a conveyor section 200 of a conveyor system 100. In some embodiments, the conveyor section 200 illustrated in FIG. 2 may be representative of one or more of the conveyor sections in the plurality of conveyor sections 104. For example, the conveyor section 200 may be representative of the first conveyor section 104A. As another example, the conveyor section 200 may be representative of the second conveyor section 104B. As another example, the conveyor section 200 may be representative of the third conveyor section 104C.

In some embodiments, the conveyor section 200 may include one or more motorized drive rollers 202. In some embodiments, the one or more motorized drive rollers 202 may be fixed to a frame 208 of the conveyor section 200. In some embodiments, the one or more motorized drive rollers 202 may be configured to facilitate the transport of one or more objects throughout the conveyor system 100. For example, the one or more motorized drive rollers 202 may be configured to facilitate the transport of one or more objects throughout a conveyor section of the plurality of conveyor sections 104. As another example, the one or more motorized drive rollers 202 may be configured to facilitate the transport of one or more objects from one conveyor section to another conveyor section in the plurality of conveyor sections 104.

In some embodiments, the one or more motorized drive rollers 202 may be actively driven. In some embodiments, the one or more motorized drive rollers 202 may be actively driven by a motor. In some embodiments, the motor may be operably coupled to the one or more motorized drive rollers 202 (e.g., the actively driven rollers) by at least a drive belt 206. In this regard, for example, a motor, the drive belt 206, and/or other means may be configured to actuate the one or more motorized drive rollers 202 such that the one or more motorized drive rollers 202 may facilitate the transport on one or more objects throughout a conveyor sections and/or from one conveyor section to another conveyor section.

In some embodiments, the conveyor section 200 may include one or more passive bed rollers 204. In some embodiments, the one or more passive bed rollers 204 may be fixed to a frame 208 of the conveyor section 200. In some embodiments, the one or more passive bed rollers 204 may be configured to facilitate the transport of one or more objects throughout the conveyor system 100. For example, the one or more passive bed rollers 204 may be configured to facilitate the transport of one or more objects throughout a conveyor section of the plurality of conveyor sections 104. As another example, the one or more passive bed rollers 204 may be configured to facilitate the transport of one or more objects from one conveyor section to another conveyor section in the plurality of conveyor sections 104. In this regard, for example, the one or more passive bed rollers 204 may be configured to facilitate movement of objects between the one or more motorized drive rollers 202 that propel the objects forward.

In some embodiments, the conveyor section 200 may include one or more sensors 212. In some embodiments, the one or more sensors 212 may be configured to detect one or more aspects of the conveyor section 200 and/or the ambient conditions of a facility in which the conveyor section 200 is placed. For example, the one or more sensors 212 may be configured to detect the weight and/or orientation of an object being supported by or transported by the conveyor section 200 throughout the conveyor system 100. As another example, the one or more sensors 212 may be configured to detect the temperature of the facility in which the conveyor section 200 is located.

In some embodiments, the conveyor section 200 may include wiring 214 and/or a MDR operations circuitry 210. In some embodiments, the MDR operations circuitry 210 may be indicative of an input/output (IO) module associated with the conveyor section 200. In some embodiments, the wiring 214 may connect (e.g., electrically connect) the MDR operations circuitry 210 to the one or more motorized drive rollers 202 (e.g., in order to actively drive a motorized drive roller). In some embodiments, the wiring 214 may connect (e.g., electrically connect) the MDR operations circuitry 210 of the conveyor section 200 to MDR operations circuitry associated with another conveyor sections. In some embodiments, the wiring 214 may connect (e.g., electrically connect) the MDR operations circuitry 210 of the conveyor section 200 to the conveyor system controller 102.

In some embodiments, the MDR operations circuitry of each of the plurality of conveyor sections 104 may be in communication with the conveyor system controller 102. For example, the first conveyor section 104A, the second conveyor section 104B, and the third conveyor section 104C may in communication with the conveyor system controller 102. In some embodiments, the MDR operations circuitry of at least one of the plurality of conveyor sections 104 may be in direct communication with the conveyor system controller 102. For example, the third MDR operations circuitry 106C may be in direct communication with the conveyor system controller 102. In some embodiments, the MDR operations circuitry of one or more of the plurality of conveyor sections 104 may be in communication with the conveyor system controller 102 via the MDR operations circuitry of one or more other conveyor sections of the plurality of conveyor sections 104. In this regard, for example, the MDR operations circuitries may be organized in a series in which upstream MDR operations circuitries facilitate communication with the conveyor system controller 102 for downstream MDR operations circuitries. For example, the first MDR operations circuitry 106A of the first conveyor section 104A may facilitate communication with the conveyor system controller 102 for the second MDR operations circuitry 106B of the second conveyor section 104B because the second MDR operations circuitry 106B is downstream from the first MDR operations circuitry 106A. As another example, the third MDR operations circuitry 106C of the third conveyor section 104C may facilitate communication with the conveyor system controller 102 for the first MDR operations circuitry 106A of the first conveyor section 104A because the first MDR operations circuitry 106A is downstream from the third MDR operations circuitry 106C.

In some embodiments, a MDR operations circuitry may be affected by a MDR operations circuitry fault. In some embodiments, a MDR operations circuitry fault may be indicative of a power supply fault. In this regard, a power supply fault may indicate that a power supply for a MDR operations circuitry has been interrupted such that the MDR operations circuitry is not able to operate (e.g., not able to drive one or more motorized drive rollers and/or or communicate with the conveyor system controller 102). In some embodiments, a MDR operations circuitry fault may be indicative of a network fault. In this regard, a network fault may indicate that a MDR operations circuitry is not able to connect to a network associated with a facility in which the conveyor system 100 operates (e.g., a network that the MDR operations circuitry uses to communicate with the conveyor system controller 102).

In some embodiments, a MDR operations circuitry fault may cause a MDR operations circuitry downstream from the MDR operations circuitry affected by the MDR operations circuitry fault to be affected by a connection fault. For example, if the first MDR operations circuitry 106A is affected by a MDR operations circuitry fault, the second MDR operations circuitry 106B may be affected by a connection fault (e.g., because the second MDR operations circuitry 106B is downstream from the first MDR operations circuitry 106A). In some embodiments, a connection fault may be a fault in which a MDR operations circuitry is unable to connect to the conveyor system controller 102 (e.g., due to being downstream from a MDR operations circuitry affected by a MDR operations circuitry fault).

In some embodiments, when a MDR operations circuitry fault occurs, a MDR operations circuitry upstream from the MDR operations circuitry affected by the MDR operations circuitry fault may not be affected by a connection fault. For example, if the first MDR operations circuitry 106A is affected by a MDR operations circuitry fault, the third MDR operations circuitry 106C may not be affected by a connection fault (e.g., because the third MDR operations circuitry 106C is upstream from the first MDR operations circuitry 106A).

In some embodiments, the conveyor system controller 102 may be configured to identify a MDR operations circuitry fault. In some embodiments, the conveyor system controller 102 may be configured to identify a MDR operations circuitry fault when the conveyor system controller 102 is unable to communicate with one or more of the MDR operations circuitries. For example, the conveyor system controller 102 may be unable to communicate with one or more of the MDR operations circuitries when the conveyor system controller 102 sends a command to one or more of the MDR operations circuitries and does not receive a reply.

In some embodiments, the conveyor system controller 102 may be configured to determine that a MDR operations circuitry fault is associated with one of MDR operations circuitries in the plurality of conveyor sections 104. In this regard, for example, the conveyor system controller 102 may be configured to determine that a MDR operations circuitry is affected by a MDR operations circuitry fault when the conveyor system controller 102 is unable to communicate with the MDR operations circuitry and any of the MDR operations circuitries downstream from the MDR operations circuitry (e.g., there has been a communication drop between an MDR operations circuitry and the conveyor system controller 102). For example, the conveyor system controller 102 may be configured to determine that the first MDR operations circuitry 106A is affected by a MDR operations circuitry fault when the conveyor system controller 102 is unable to communicate with the first MDR operations circuitry 106A and the second MDR operations circuitry 106B. Additionally, or alternatively, the conveyor system controller 102 may be configured to determine that a MDR operations circuitry is affected by a MDR operations circuitry fault when the conveyor system controller 102 is unable to communicate with the MDR operations circuitry and is able to communicate with other MDR operations circuitries upstream from the MDR operations circuitry. For example, the conveyor system controller 102 may be configured to determine that the first MDR operations circuitry 106A is affected by a MDR operations circuitry fault when the conveyor system controller 102 is unable to communicate with the first MDR operations circuitry 106A and is able to communicate with the third MDR operations circuitry 106C.

In some embodiments, the conveyor system controller 102 may be configured to initiate performance of one or more MDR operations circuitry fault response actions. In some embodiments, the conveyor system controller 102 may be configured to initiate performance of one or more MDR operations circuitry fault response actions based at least in part on a determination that a MDR operations circuitry is affected by a MDR operations circuitry fault. For example, the conveyor system controller 102 may be configured to initiate performance of one or more MDR operations circuitry fault response actions in response to determining that a MDR operations circuitry fault is associated with the first MDR operations circuitry 106A.

In some embodiments, initiating performance of one or more MDR operations circuitry fault response actions may include the conveyor system controller 102 being configured to trigger an alarm. For example, the conveyor system controller 102 may be configured to trigger an alarm at a facility in which the conveyor system 100 operates to indicate to individuals in the warehouse that there is a fault associated with the conveyor system 100.

In some embodiments, initiating performance of one or more MDR operations circuitry fault response actions may include the conveyor system controller 102 being configured to cause at least one of the plurality of conveyor sections 104 to cease operation. In this regard, for example, the conveyor system controller 102 may be configured to cause at least one of the plurality of conveyor sections 104 to cease operation to prevent further faults or errors from happening with the conveyor system 100 (e.g., prevent an object being transported throughout the conveyor system from being improperly handled because the MDR operations circuitry fault is impacting the operations of the conveyor system). For example, initiating performance of one or more MDR operations circuitry fault response actions may include the conveyor system controller 102 being configured to cause the third conveyor section 104C to cease operation when the first MDR operations circuitry 106A is affected by a MDR operations circuitry fault. In this way, the conveyor system controller 102 may be prevent objects from being transferred to a conveyor section with a MDR operations circuitry affected by a MDR operations circuitry fault (e.g., because the first MDR operations circuitry 106A is affected by a fault it may be undesirable for objects to be transferred from the third conveyor section 104C to the first conveyor section 104A).

In some embodiments, initiating performance of one or more MDR operations circuitry fault response actions may include the conveyor system controller 102 being configured to generate a conveyor system fault schematic interface component 302. In some embodiments, the conveyor system fault schematic interface component 302 may include a representation 304 of the plurality of conveyor sections 104. In some embodiments, the conveyor system fault schematic interface component 302 may include a first visual representation 306. In some embodiments, the first visual representation 306 may indicate one or more conveyor sections in the plurality of conveyor sections 104 that includes a MDR operations circuitry affected by a MDR operations circuitry fault. In some embodiments, the first visual representation 306 may include color, shading, text, other visual representations, and/or the like to indicate one or more conveyor sections in the plurality of conveyor sections 104 that includes a MDR operations circuitry affected by a MDR operations circuitry fault. For example, the first visual representation 306 may include a starburst and/or a particular color (e.g., red).

In some embodiments, the conveyor system fault schematic interface component 302 may include a second visual representation 308. In some embodiments, the second visual representation 308 may indicate one or more conveyor sections in the plurality of conveyor sections 104 that includes a MDR operations circuitry affected by a connection fault. In some embodiments, the second visual representation 308 may include color, shading, text, other visual representations, and/or the like to indicate one or more conveyor sections in the plurality of conveyor sections 104 that includes a MDR operations circuitry affected by a connection fault. For example, the second visual representation 308 may include a particular color (e.g., red).

In some embodiments, the conveyor system fault schematic interface component 302 may include a third visual representation 310. In some embodiments, the third visual representation 310 may indicate one or more conveyor sections in the plurality of conveyor sections 104 that includes a MDR operations circuitry that is not affected by a MDR operations circuitry fault and/or a connection fault. In some embodiments, the third visual representation 310 may include color, shading, text, other visual representations, and/or the like to indicate one or more conveyor sections in the plurality of conveyor sections 104 that includes a MDR operations circuitry that is not affected by a connection fault and/or a MDR operations circuitry fault. For example, the third visual representation 310 may include a particular color (e.g., red).

In some embodiments, initiating performance of one or more MDR operations circuitry fault response actions may include the conveyor system controller 102 being configured to cause rendering of the conveyor system fault schematic interface component 302 on a conveyor system interface 300. In this regard, for example, by initiating performance of one or more MDR operations circuitry fault response actions, the conveyor system controller 102 may be configured to enable MDR operations circuitry faults to be remedied before a secondary effect of the MDR operations circuitry faults occurs (e.g., an object jam).

Example Methods

Figure 4:
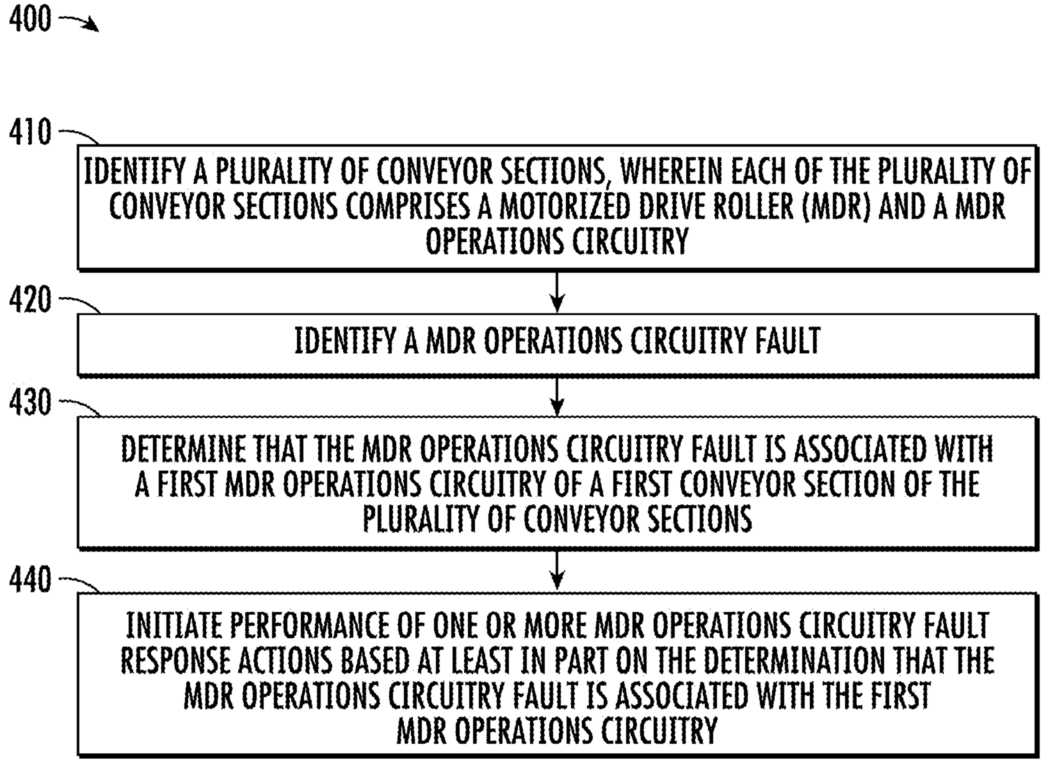
FIG. 4 illustrates a flowchart of an example method in accordance with one or more embodiments of the present disclosure.

Referring now to FIG. 4, a flowchart providing an example method 400 is illustrated. In this regard, FIG. 4 illustrates operations that may be performed by the conveyor system controller 102 and/or other components of the conveyor system 100. For example, in some embodiments, the operations illustrated in FIG. 4 may, for example, be performed by, with the assistance of, and/or under the control of the conveyor system controller 102 (e.g., processing circuitry 702, memory 704, processor 706, user interface 708, and/or communication interface 710) and/or the like.

As shown in block 410, the method 400 may include identifying a plurality of conveyor sections. As described above, in some embodiments, the plurality of conveyor sections may include three conveyor sections. For example, the plurality of conveyor sections may include a first conveyor section. As another example, the plurality of conveyor sections may include a second conveyor section. As another example, the plurality of conveyor sections may include a third conveyor section.

In some embodiments, each of the plurality of conveyor sections may include a motorized drive roller (MDR) operations circuitry. In some embodiments, the MDR operations circuitry may be indicative of an input/output (IO) module associated with the conveyor section. For example, the first conveyor section may include a first MDR operations circuitry. As another example, the second conveyor section may include a second MDR operations circuitry. As another example, the third conveyor section may include a third MDR operations circuitry. In some embodiments, a conveyor section of the plurality of conveyor sections may correspond to a conveyor zone. Additionally, or alternatively, a conveyor section of the plurality of conveyor sections may correspond to a conveyor bed. In some embodiments, a conveyor bed may include one or more conveyor zones.

As shown in block 420, the method 400 may include identifying a MDR operations circuitry fault. As described above, in some embodiments, a MDR operations circuitry fault may be indicative of a power supply fault. In this regard, a power supply fault may indicate that a power supply for a MDR operations circuitry has been interrupted such that the MDR operations circuitry is not able to operate (e.g., not able to drive one or more motorized drive rollers and/or or communicate with the conveyor system controller). In some embodiments, a MDR operations circuitry fault may be indicative of a network fault. In this regard, a network fault may indicate that a MDR operations circuitry is not able to connect to a network associated with a facility in which the conveyor system operates (e.g., a network that the MDR operations circuitry uses to communicate with the conveyor system controller).

In some embodiments, the conveyor system controller may be configured to identify a MDR operations circuitry fault when the conveyor system controller is unable to communicate with one or more of the MDR operations circuitries. For example, the conveyor system controller may be unable to communicate with one or more of the MDR operations circuitries when the conveyor system controller sends a command to one or more of the MDR operations circuitries and does not receive a reply.

As shown in block 430, the method 400 may include determining that the MDR operations circuitry fault is associated with a first MDR operations circuitry of a first conveyor section of the plurality of conveyor sections. As described above, in some embodiments, the conveyor system controller may be configured to determine that a MDR operations circuitry fault is associated with one of MDR operations circuitries in the plurality of conveyor sections. In this regard, for example, the conveyor system controller may be configured to determine that a MDR operations circuitry is affected by a MDR operations circuitry fault when the conveyor system controller is unable to communicate with the MDR operations circuitry and any of the MDR operations circuitries downstream from the MDR operations circuitry (e.g., there has been a communication drop between an MDR operations circuitry and the conveyor system controller). For example, the conveyor system controller may be configured to determine that the first MDR operations circuitry is affected by a MDR operations circuitry fault when the conveyor system controller is unable to communicate with the first MDR operations circuitry and the second MDR operations circuitry. Additionally, or alternatively, the conveyor system controller may be configured to determine that a MDR operations circuitry is affected by a MDR operations circuitry fault when the conveyor system controller is unable to communicate with the MDR operations circuitry and is able to communicate with other MDR operations circuitries upstream from the MDR operations circuitry. For example, the conveyor system controller may be configured to determine that the first MDR operations circuitry is affected by a MDR operations circuitry fault when the conveyor system controller is unable to communicate with the first MDR operations.

As shown in block 440, the method 400 may include initiating performance of one or more MDR operations circuitry fault response actions based at least in part on the determination that the MDR operations circuitry fault is associated with the first MDR operations circuitry. As described above, in some embodiments, the conveyor system controller may be configured to initiate performance of one or more MDR operations circuitry fault response actions based at least in part on a determination that a MDR operations circuitry is affected by a MDR operations circuitry fault. For example, the conveyor system controller may be configured to initiate performance of one or more MDR operations circuitry fault response actions in response to determining that a MDR operations circuitry fault is associated with the first MDR operations circuitry.

In some embodiments, initiating performance of one or more MDR operations circuitry fault response actions may include the conveyor system controller being configured to trigger an alarm. For example, the conveyor system controller may be configured to trigger an alarm at a facility in which the conveyor system operates to indicate to individuals in the warehouse that there is a fault associated with the conveyor system.

In some embodiments, initiating performance of one or more MDR operations circuitry fault response actions may include the conveyor system controller being configured to cause at least one of the plurality of conveyor sections to cease operation. In this regard, for example, the conveyor system controller may be configured to cause at least one of the plurality of conveyor sections to cease operation to prevent further faults or errors from happening with the conveyor system (e.g., prevent an object being transported throughout the conveyor system from being improperly handled because the MDR operations circuitry fault is impacting the operations of the conveyor system). For example, initiating performance of one or more MDR operations circuitry fault response actions may include the conveyor system controller being configured to cause the third conveyor section to cease operation when the first MDR operations circuitry is affected by a MDR operations circuitry fault. In this way, the conveyor system controller may be prevent objects from being transferred to a conveyor section with a MDR operations circuitry affected by a MDR operations circuitry fault (e.g., because the first MDR operations circuitry is affected by a fault it may be undesirable for objects to be transferred from the third conveyor section to the first conveyor section).

In some embodiments, initiating performance of one or more MDR operations circuitry fault response actions may include the conveyor system controller being configured to generate a conveyor system fault schematic interface component. In some embodiments, the conveyor system fault schematic interface component may include a representation of the plurality of conveyor sections. In some embodiments, the conveyor system fault schematic interface component may include a first visual representation. In some embodiments, the first visual representation may indicate one or more conveyor sections in the plurality of conveyor sections that includes a MDR operations circuitry affected by a MDR operations circuitry fault. In some embodiments, the first visual representation may include color, shading, text, other visual representations, and/or the like to indicate one or more conveyor sections in the plurality of conveyor sections that includes a MDR operations circuitry affected by a MDR operations circuitry fault. For example, the first visual representation may include a starburst and/or a particular color (e.g., red).

In some embodiments, the conveyor system fault schematic interface component may include a second visual representation. In some embodiments, the second visual representation may indicate one or more conveyor sections in the plurality of conveyor sections that includes a MDR operations circuitry affected by a connection fault. In some embodiments, the second visual representation may include color, shading, text, other visual representations, and/or the like to indicate one or more conveyor sections in the plurality of conveyor sections that includes a MDR operations circuitry affected by a connection fault. For example, the second visual representation may include a particular color (e.g., red).

In some embodiments, the conveyor system fault schematic interface component may include a third visual representation. In some embodiments, the third visual representation may indicate one or more conveyor sections in the plurality of conveyor sections that includes a MDR operations circuitry that is not affected by a MDR operations circuitry fault and/or a connection fault. In some embodiments, the third visual representation may include color, shading, text, other visual representations, and/or the like to indicate one or more conveyor sections in the plurality of conveyor sections that includes a MDR operations circuitry that is not affected by a connection fault and/or a MDR operations circuitry fault. For example, the third visual representation may include a particular color (e.g., red).

In some embodiments, initiating performance of one or more MDR operations circuitry fault response actions may include the conveyor system controller being configured to cause rendering of the conveyor system fault schematic interface component on a conveyor system interface. In this regard, for example, by initiating performance of one or more MDR operations circuitry fault response actions, the conveyor system controller may be configured to enable MDR operations circuitry faults to be remedied before a secondary effect of the MDR operations circuitry faults occurs (e.g., an object jam).

Figure 5:
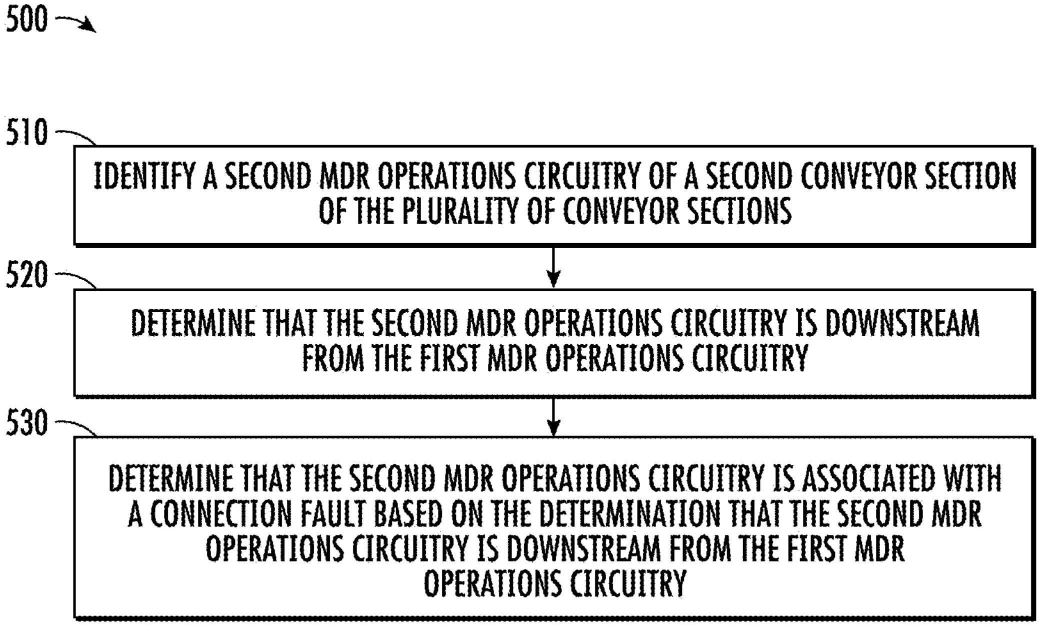
FIG. 5 illustrates a flowchart of an example method in accordance with one or more embodiments of the present disclosure.

Referring now to FIG. 5, a flowchart providing an example method 500 is illustrated. In this regard, FIG. 5 illustrates operations that may be performed by the conveyor system controller 102 and/or other components of the conveyor system 100. For example, in some embodiments, the operations illustrated in FIG. 5 may, for example, be performed by, with the assistance of, and/or under the control of the conveyor system controller 102 (e.g., processing circuitry 702, memory 704, processor 706, user interface 708, and/or communication interface 710) and/or the like.

As shown in block 510, the method 500 may include identifying a second MDR operations circuitry of a second conveyor section of the plurality of conveyor sections. As described above, in some embodiments, the plurality of conveyor sections may include three conveyor sections. For example, the plurality of conveyor sections may include a first conveyor section. As another example, the plurality of conveyor sections may include a second conveyor section. As another example, the plurality of conveyor sections may include a third conveyor section.

In some embodiments, each of the plurality of conveyor sections may include a motorized drive roller (MDR) operations circuitry. For example, the first conveyor section may include a first MDR operations circuitry. As another example, the second conveyor section may include a second MDR operations circuitry. As another example, the third conveyor section may include a third MDR operations circuitry. In some embodiments, a conveyor section of the plurality of conveyor sections may correspond to a conveyor zone. Additionally, or alternatively, a conveyor section of the plurality of conveyor sections may correspond to a conveyor bed. In some embodiments, a conveyor bed may include one or more conveyor zones.

As shown in block 520, the method 500 may include determining that the second MDR operations circuitry is downstream from the first MDR operations circuitry. As described above, in some embodiments, the MDR operations circuitry of each of the plurality of conveyor sections may be in communication with the conveyor system controller. For example, the first conveyor section, the second conveyor section, and the third conveyor section may in communication with the conveyor system controller. In some embodiments, the MDR operations circuitry of at least one of the plurality of conveyor sections may be in direct communication with the conveyor system controller. For example, the third MDR operations circuitry may be in direct communication with the conveyor system controller. In some embodiments, the MDR operations circuitry of one or more of the plurality of conveyor sections may be in communication with the conveyor system controller via the MDR operations circuitry of one or more other conveyor sections of the plurality of conveyor sections. In this regard, for example, the MDR operations circuitries may be organized in a series in which upstream MDR operations circuitries facilitate communication with the conveyor system controller for downstream MDR operations circuitries. For example, the first MDR operations circuitry of the first conveyor section may facilitate communication with the conveyor system controller for the second MDR operations circuitry of the second conveyor section because the second MDR operations circuitry is downstream from the first MDR operations circuitry. As another example, the third MDR operations circuitry of the third conveyor section may facilitate communication with the conveyor system controller for the first MDR operations circuitry of the first conveyor section because the first MDR operations circuitry is downstream from the third MDR operations circuitry.

As shown in block 530, the method 500 may include determining that the second MDR operations circuitry is associated with a connection fault based on the determination that the second MDR operations circuitry is downstream from the first MDR operations circuitry. As described above, in some embodiments, a MDR operations circuitry fault may cause a MDR operations circuitry downstream from the MDR operations circuitry affected by the MDR operations circuitry fault to be affected by a connection fault. For example, if the first MDR operations circuitry is affected by a MDR operations circuitry fault, the second MDR operations circuitry may be affected by a connection fault (e.g., because the second MDR operations circuitry is downstream from the first MDR operations circuitry). In some embodiments, a connection fault may be a fault in which a MDR operations circuitry is unable to connect to the conveyor system controller (e.g., due to being downstream from a MDR operations circuitry affected by a MDR operations circuitry fault).

Figure 6:
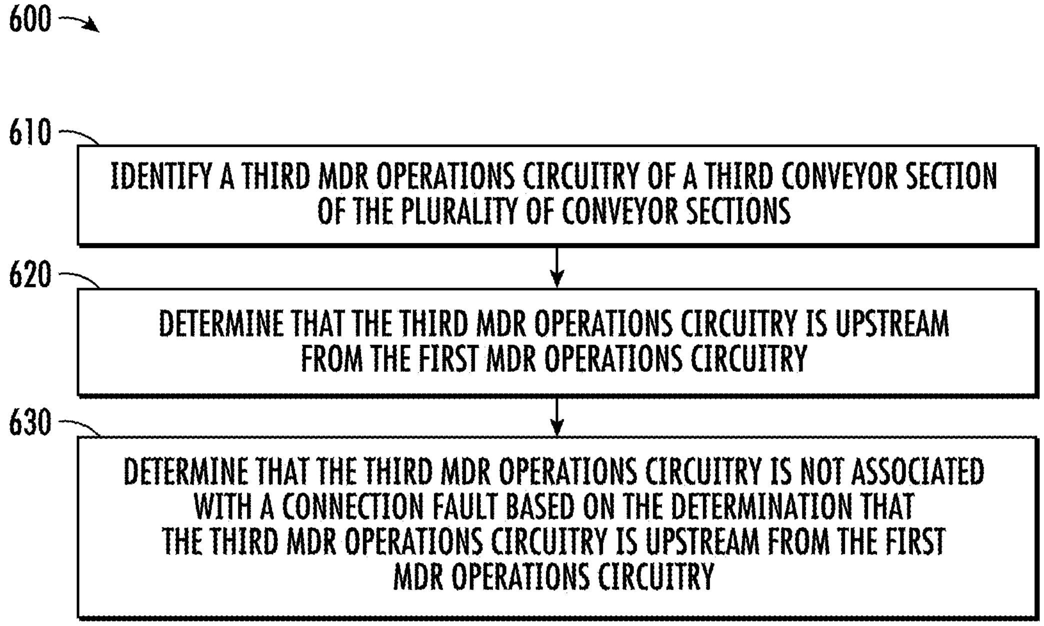
FIG. 6 illustrates a flowchart of an example method in accordance with one or more embodiments of the present disclosure.

Referring now to FIG. 6, a flowchart providing an example method 600 is illustrated. In some embodiments, the example method 600 may include one or more operations for initiating performance of one or more MDR operations circuitry fault response actions. In this regard, FIG. 6 illustrates operations that may be performed by the conveyor system controller 102 and/or other components of the conveyor system 100. For example, in some embodiments, the operations illustrated in FIG. 6 may, for example, be performed by, with the assistance of, and/or under the control of the conveyor system controller 102 (e.g., processing circuitry 702, memory 704, processor 706, user interface 708, and/or communication interface 710) and/or the like.

As shown in block 610, the method 600 may include identifying a third MDR operations circuitry of a third conveyor section of the plurality of conveyor sections. As described above, in some embodiments, the plurality of conveyor sections may include three conveyor sections. For example, the plurality of conveyor sections may include a first conveyor section. As another example, the plurality of conveyor sections may include a second conveyor section. As another example, the plurality of conveyor sections may include a third conveyor section.

In some embodiments, each of the plurality of conveyor sections may include a motorized drive roller (MDR) operations circuitry. For example, the first conveyor section may include a first MDR operations circuitry. As another example, the second conveyor section may include a second MDR operations circuitry. As another example, the third conveyor section may include a third MDR operations circuitry. In some embodiments, a conveyor section of the plurality of conveyor sections may correspond to a conveyor zone. Additionally, or alternatively, a conveyor section of the plurality of conveyor sections may correspond to a conveyor bed. In some embodiments, a conveyor bed may include one or more conveyor zones.

As shown in block 620, the method 600 may include determining that the third MDR operations circuitry is upstream from the first MDR operations circuitry. As described above, in some embodiments, the MDR operations circuitry of each of the plurality of conveyor sections may be in communication with the conveyor system controller. For example, the first conveyor section, the second conveyor section, and the third conveyor section may in communication with the conveyor system controller. In some embodiments, the MDR operations circuitry of at least one of the plurality of conveyor sections may be in direct communication with the conveyor system controller. For example, the third MDR operations circuitry may be in direct communication with the conveyor system controller. In some embodiments, the MDR operations circuitry of one or more of the plurality of conveyor sections may be in communication with the conveyor system controller via the MDR operations circuitry of one or more other conveyor sections of the plurality of conveyor sections. In this regard, for example, the MDR operations circuitries may be organized in a series in which upstream MDR operations circuitries facilitate communication with the conveyor system controller for downstream MDR operations circuitries. For example, the first MDR operations circuitry of the first conveyor section may facilitate communication with the conveyor system controller for the second MDR operations circuitry of the second conveyor section because the second MDR operations circuitry is downstream from the first MDR operations circuitry. As another example, the third MDR operations circuitry of the third conveyor section may facilitate communication with the conveyor system controller for the first MDR operations circuitry of the first conveyor section because the first MDR operations circuitry is downstream from the third MDR operations circuitry.

As shown in block 630, the method 600 may include determining that the third MDR operations circuitry is not associated with a connection fault based on the determination that the third MDR operations circuitry is upstream from the first MDR operations circuitry. As described above, in some embodiments, when a MDR operations circuitry fault occurs, a MDR operations circuitry upstream from the MDR operations circuitry affected by the MDR operations circuitry fault may not be affected by a connection fault. For example, if the first MDR operations circuitry is affected by a MDR operations circuitry fault, the third MDR operations circuitry may not be affected by a connection fault (e.g., because the third MDR operations circuitry is upstream from the first MDR operations circuitry).

Example Computer Processing Device

Figure 7:
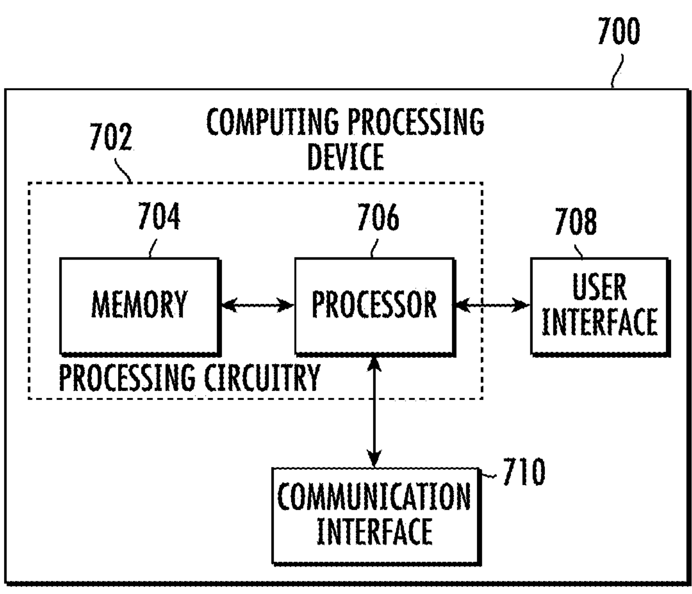
FIG. 7 illustrates a block diagram of an example computer processing device in accordance with one or more embodiments of the present disclosure.

With reference to FIG. 7, a block diagram of an example computer processing device 700 is illustrated in accordance with some example embodiments. In some embodiments, the conveyor system controller 102, the MDR operations circuitry, and/or other devices may be embodied as one or more computer processing devices, such as the computer processing device 700 in FIG. 7. However, it should be noted that the components, devices, or elements illustrated in and described with respect to FIG. 7 below may not be mandatory and thus one or more may be omitted in certain embodiments. Additionally, some embodiments may include further or different components, devices or elements beyond those illustrated in and described with respect to FIG. 7.

The computer processing device 700 may include or otherwise be in communication with processing circuitry 702 that is configurable to perform actions in accordance with one or more embodiments disclosed herein. In this regard, the processing circuitry 702 may be configured to perform and/or control performance of one or more functionalities of the computer processing device 700 in accordance with various embodiments, and thus may provide means for performing functionalities of the computer processing device 700 in accordance with various embodiments. The processing circuitry 702 may be configured to perform data processing, application execution and/or other processing and management services according to one or more embodiments. In some embodiments, the computer processing device 700 or a portion(s) or component(s) thereof, such as the processing circuitry 702, may be embodied as or comprise a chip or chip set. In other words, the computer processing device 700 or the processing circuitry 702 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computer processing device 700 or the processing circuitry 702 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 702 may include a processor 706 and, in some embodiments, such as that illustrated in FIG. 7, may further include memory 704. The processing circuitry 702 may be in communication with or otherwise control a user interface 708 and/or a communication interface 710. As such, the processing circuitry 702 may be embodied as a circuit chip (e.g., an integrated circuit chip) configured (e.g., with hardware, software or a combination of hardware and software) to perform operations described herein.

The processor 706 may be embodied in a number of different ways. For example, the processor 706 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 706 may comprise a plurality of processors. The plurality of processors may be in operative communication with each other and may be collectively configured to perform one or more functionalities of the computer processing device 700 as described herein. In some embodiments, the processor 706 may be configured to execute instructions stored in the memory 704 or otherwise accessible to the processor 706. As such, whether configured by hardware or by a combination of hardware and software, the processor 706 may represent an entity (e.g., physically embodied in circuitry—in the form of processing circuitry 702) capable of performing operations according to embodiments of the present disclosure while configured accordingly. Thus, for example, when the processor 706 is embodied as an ASIC, FPGA or the like, the processor 706 may be specifically configured hardware for conducting the operations described herein. Alternatively, as another example, when the processor 706 is embodied as an executor of software instructions, the instructions may specifically configure the processor 706 to perform one or more operations described herein.

In some embodiments, the memory 704 may include one or more non-transitory memory devices such as, for example, volatile and/or non-volatile memory that may be either fixed or removable. In this regard, the memory 704 may comprise a non-transitory computer-readable storage medium. It will be appreciated that while the memory 704 is illustrated as a single memory, the memory 704 may comprise a plurality of memories. The memory 704 may be configured to store information, data, applications, instructions and/or the like for enabling the computer processing device 700 to carry out various functions in accordance with one or more embodiments. For example, the memory 704 may be configured to buffer input data for processing by the processor 706. Additionally, or alternatively, the memory 704 may be configured to store instructions for execution by the processor 706. As yet another alternative, the memory 704 may include one or more databases that may store a variety of files, contents or data sets. Among the contents of the memory 704, applications may be stored for execution by the processor 706 in order to carry out the functionality associated with each respective application. In some cases, the memory 704 may be in communication with one or more of the processor 706, user interface 708, and/or communication interface 710 via a bus(es) for passing information among components of the computer processing device 700.

The user interface 708 may be in communication with the processing circuitry 702 to receive an indication of a user input at the user interface 708 and/or to provide an audible, visual, mechanical or other output to the user. As such, the user interface 708 may include, for example, a keyboard, a mouse, a joystick, a display, a touch screen display, a microphone, a speaker, and/or other input/output mechanisms. As such, the user interface 708 may, in some embodiments, provide means for a user to access and interact with the conveyor system 100.

The communication interface 710 may include one or more interface mechanisms for enabling communication with other devices and/or networks. In some cases, the communication interface 710 may be any means such as a device or circuitry embodied in either hardware, or a combination of hardware and software that is configured to receive and/or transmit data from/to a network and/or any other device or module in communication with the processing circuitry 702. By way of example, the communication interface 710 may be configured to enable the conveyor system controller 102 to communicate with one or more MDR operations circuitries. Accordingly, the communication interface 710 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R.

1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A conveyor system comprising:

a plurality of conveyor sections, wherein each of the plurality of conveyor sections comprises a motorized drive roller (MDR) and a MDR operations circuitry; and a conveyor system controller comprising at least one processor and at least one non-transitory memory comprising program code, wherein the at least one non-transitory memory and the program code are configured to, with the at least one processor, cause the conveyor system controller to:

identify a MDR operations circuitry fault;

determine that the MDR operations circuitry fault is associated with a first MDR operations circuitry of a first conveyor section of the plurality of conveyor sections;

initiate performance of one or more MDR operations circuitry fault response actions based at least in part on the determination that the MDR operations circuitry fault is associated with the first MDR operations circuitry;

identify a second MDR operations circuitry of a second conveyor section of the plurality of conveyor sections;

determine that the second MDR operations circuitry is downstream from the first MDR operations circuitry; and determine that the second MDR operations circuitry is associated with a connection fault based on the determination that the second MDR operations circuitry is downstream from the first MDR operations circuitry.

2. The conveyor system of claim 1, wherein the MDR operations circuitry fault is indicative of a power supply fault.

3. The conveyor system of claim 1, wherein the MDR operations circuitry fault is indicative of a network fault.

4. The conveyor system of claim 1, wherein the conveyor system controller is further caused to:

identify a third MDR operations circuitry of a third conveyor section of the plurality of conveyor sections;

determine that the third MDR operations circuitry is upstream from the first MDR operations circuitry; and determine that the third MDR operations circuitry is not associated with the connection fault based on the determination that the third MDR operations circuitry is upstream from the first MDR operations circuitry.

5. The conveyor system of claim 1, wherein initiating performance of the one or more MDR operations circuitry fault response actions comprises:

generating a conveyor system fault schematic interface component; and causing rendering of the conveyor system fault schematic interface component on a conveyor system interface.

6. The conveyor system of claim 5, wherein the conveyor system fault schematic interface component comprises a first visual representation indicating that the MDR operations circuitry fault is associated with the first MDR operations circuitry of the first conveyor section.

7. The conveyor system of claim 5, wherein the conveyor system fault schematic interface component comprises a second visual representation indicating that the second MDR operations circuitry of the second conveyor section of the plurality of conveyor sections is associated with the connection fault.

8. A method comprising:

identifying a plurality of conveyor sections, wherein each of the plurality of conveyor sections comprises a motorized drive roller (MDR) and a MDR operations circuitry;

identifying a MDR operations circuitry fault;

determining that the MDR operations circuitry fault is associated with a first MDR operations circuitry of a first conveyor section of the plurality of conveyor sections;

initiating performance of one or more MDR operations circuitry fault response actions based at least in part on the determination that the MDR operations circuitry fault is associated with the first MDR operations circuitry;

identifying a second MDR operations circuitry of a second conveyor section of the plurality of conveyor sections;

determining that the second MDR operations circuitry is downstream from the first MDR operations circuitry; and determining that the second MDR operations circuitry is associated with a connection fault based on the determination that the second MDR operations circuitry is downstream from the first MDR operations circuitry.

9. The method of claim 8, wherein the MDR operations circuitry fault is indicative of a power supply fault.

10. The method of claim 8, wherein the MDR operations circuitry fault is indicative of a network fault.

11. The method of claim 8, further comprising:

identifying a third MDR operations circuitry of a third conveyor section of the plurality of conveyor sections;

determining that the third MDR operations circuitry is upstream from the first MDR operations circuitry; and determining that the third MDR operations circuitry is not associated with the connection fault based on the determination that the third MDR operations circuitry is upstream from the first MDR operations circuitry.

12. The method of claim 8, wherein initiating performance of the one or more MDR operations circuitry fault response actions comprises:

generating a conveyor system fault schematic interface component; and causing rendering of the conveyor system fault schematic interface component on a conveyor system interface.

13. The method of claim 12, wherein the conveyor system fault schematic interface component comprises a first visual representation indicating that the MDR operations circuitry fault is associated with the first MDR operations circuitry of the first conveyor section.

14. The method of claim 12, wherein the conveyor system fault schematic interface component comprises a second visual representation indicating that the second MDR operations circuitry of the second conveyor section of the plurality of conveyor sections is associated with the connection fault.

15. A computer program product comprising at least one non-transitory computer-readable storage medium having computer program code stored thereon that, in execution with at least one processor, configures the computer program product for:

identifying a plurality of conveyor sections, wherein each of the plurality of conveyor sections comprises a motorized drive roller (MDR) and a MDR operations circuitry;

identifying a MDR operations circuitry fault;

determining that the MDR operations circuitry fault is associated with a first MDR operations circuitry of a first conveyor section of the plurality of conveyor sections;

initiating performance of one or more MDR operations circuitry fault response actions based at least in part on the determination that the MDR operations circuitry fault is associated with the first MDR operations circuitry;

identifying a second MDR operations circuitry of a second conveyor section of the plurality of conveyor sections;

determining that the second MDR operations circuitry is downstream from the first MDR operations circuitry; and determining that the second MDR operations circuitry is associated with a connection fault based on the determination that the second MDR operations circuitry is downstream from the first MDR operations circuitry.

16. The computer program product of claim 15, wherein the MDR operations circuitry fault is indicative of a power supply fault or a network fault.

17. The computer program product of claim 15, wherein initiating performance of the one or more MDR operations circuitry fault response actions comprises:

generating a conveyor system fault schematic interface component; and causing rendering of the conveyor system fault schematic interface component on a conveyor system interface.

18. The computer program product of claim 17, wherein the conveyor system fault schematic interface component comprises a first visual representation indicating that the MDR operations circuitry fault is associated with the first MDR operations circuitry of the first conveyor section.

* * * * *